US011271723B2

(12) United States Patent
Hale

(10) Patent No.: US 11,271,723 B2
(45) Date of Patent: *Mar. 8, 2022

(54) APPARATUS AND METHOD FOR UNBREAKABLE DATA ENCRYPTION

(71) Applicant: Daniel Eugene Hale, Encinitas, CA (US)

(72) Inventor: Daniel Eugene Hale, Encinitas, CA (US)

(*) Notice: Subject to any disclaimer, the term of this patent is extended or adjusted under 35 U.S.C. 154(b) by 292 days.

This patent is subject to a terminal disclaimer.

(21) Appl. No.: 16/678,011

(22) Filed: Nov. 8, 2019

(65) Prior Publication Data

US 2020/0151343 A1    May 14, 2020

Related U.S. Application Data

(60) Provisional application No. 62/766,882, filed on Nov. 8, 2018.

(51) Int. Cl.
*H04L 9/06*     (2006.01)
*G06F 21/60*    (2013.01)
(Continued)

(52) U.S. Cl.
CPC ............ *H04L 9/0662* (2013.01); *G06F 7/582* (2013.01); *G06F 9/30029* (2013.01);
(Continued)

(58) Field of Classification Search
CPC ... H04L 9/0618; H04L 9/0631; H04L 9/0643; H04L 9/0662; H04L 9/0668;
(Continued)

(56) References Cited

U.S. PATENT DOCUMENTS 8,868,630 B1    10/2014  Boppana
2004/0255130 A1*  12/2004  Henry .................. H04L 9/12
                                                            713/189
(Continued)

OTHER PUBLICATIONS

Burman et al, Development of Dynamic Reconfiguration Implementation of AES on FPGA Platform, IEEE, 2017.*
(Continued)

*Primary Examiner* — Minh Dinh
(74) *Attorney, Agent, or Firm* — Mayer & Williams, PC; Mark K Young

(57) ABSTRACT

An encryption specification named "MetaEncrypt" implemented as a method and associated apparatus is disclosed for unbreakable encryption of data, code, applications, and other information that uses a symmetric key for encryption/decryption and to configure the underlying encryption algorithms being utilized to increase the difficulty of mathematically modeling the algorithms without possession of the key. Data from the key is utilized to select several encryption algorithms utilized by MetaEncrypt and configure the algorithms during the encryption process in which block sizes are varied and the encryption technique that is applied is varied for each block. Rather than utilizing a fixed key of predetermined length, the key in MetaEncrypt can be any length so both the key length and key content are unknown. MetaEncrypt's utilization of key data makes it impossible to model its encryption methodology to thereby frustrate cryptographic cracking and force would be hackers to utilize brute force methods to try to guess or otherwise determine the key.

18 Claims, 16 Drawing Sheets

(51) Int. Cl.
*G06F 7/58* (2006.01)
*G06F 9/30* (2018.01)
*G06F 9/54* (2006.01)
*G06F 21/78* (2013.01)

(52) U.S. Cl.
CPC ............ *G06F 9/544* (2013.01); *G06F 21/602* (2013.01); *G06F 21/78* (2013.01); *H04L 9/0643* (2013.01); *G06F 2221/0753* (2013.01); *G06F 2221/0755* (2013.01)

(58) Field of Classification Search
CPC ................ H04L 9/0869; G06F 21/602; G06F 2221/0753; G06F 2221/0755; G06F 9/30029
See application file for complete search history.

(56) References Cited

U.S. PATENT DOCUMENTS

| | | |
|---|---|---|
| 2006/0291650 A1 | 12/2006 | Ananth |
| 2010/0150350 A1* | 6/2010 | Reidenbach .......... H04L 9/0631 380/277 |
| 2013/0279692 A1 | 10/2013 | Bevan |
| 2015/0244685 A1* | 8/2015 | Shah .................... H04W 12/04 713/155 |
| 2018/0248691 A1 | 8/2018 | Henderson |

OTHER PUBLICATIONS

Dandalis et al, An Adaptive Cryptographic Engine for Internet Protocol Security Architectures, ACM, 2004.*

* cited by examiner

505 — Plain Text is "9Us": 0x39 = '9' | 0x55 = 'U' | 0x74 = 's'

510 — Plain Text as Bits: 0 0 1 1 1 0 0 1 | 0 1 0 1 0 1 0 1 | 0 1 1 1 0 1 0 0

515 — Vector of Pseudo-Random Values: 1 0 1 1 0 1 0 0 | 1 1 1 0 0 1 1 0 | 1 1 0 0 1 0 1 0

520 — Cipher Text as Bits: 1 0 0 1 0 1 0 1 | 0 0 1 0 1 1 0 0 | 1 0 1 1 1 1 1 0

525 — Cipher Text is 0x95, 0x2C, 0xBE: 0x95 (no ASCII representation) | 0x2C = ',' | 0xBE (no ASCII representation)

APPARATUS AND METHOD FOR UNBREAKABLE DATA ENCRYPTION

CROSS REFERENCE TO RELATED APPLICATION

This application claims benefit and priority to U.S. Provisional Application Ser. No. 62/766,882 filed Nov. 8, 2018, entitled "Apparatus and Method for Unbreakable Data Encryption" which is incorporated herein by reference in its entirety.

REFERENCE TO COMPUTER PROGRAM LISTING APPENDIX

A computer program listing appendix is provided on a compact disc (CD) is submitted herein as an accompaniment to the specification on a single CD that is provided in duplicate (i.e., two CDs are included in total). The information contained in the computing program listing is incorporated by reference and having the same effect as if set forth at length herein. The computer program listing on the duplicate CDs includes the following files:

| File Name | Creation Date | Size in Kilobytes |
| --- | --- | --- |
| AdditiveGen.cpp | Apr. 3, 2016 | 6 |
| AdditiveGen.h | Mar. 26, 2016 | 2 |
| BitFieldReencode.cpp | Jan. 6, 2016 | 19 |
| BitFieldReencode.h | Jan. 6, 2016 | 3 |
| BitFieldShuffle.cpp | Apr. 9, 2016 | 12 |
| BitFieldShuffle.h | Feb. 28, 2016 | 2 |
| CompositeGenArrayHD.cpp | Dec. 18, 2016 | 12 |
| CompositeGenArrayHD.h | Dec. 18, 2016 | 4 |
| CompositeGenHD.cpp | Dec. 18, 2016 | 14 |
| CompositeGenHD.h | Dec. 18, 2016 | 3 |
| Encrypt32MFC User Guide.docx | Dec. 21, 2016 | 22 |
| Encrypt32Mfc.aps | Dec. 20, 2016 | 114 |
| Encrypt32Mfc.cpp | Dec. 21, 2016 | 11 |
| Encrypt32Mfc.h | Dec. 12, 2015 | 1 |
| Encrypt32Mfc.ico | Jul. 6, 2015 | 67 |
| Encrypt32Mfc.rc | Dec. 20, 2016 | 20 |
| Encrypt32Mfc.rc2 | Nov. 28, 2015 | 1 |
| Encrypt32Mfc.sln | Nov. 28, 2015 | 2 |
| Encrypt32Mfc.vcxproj | Dec. 18, 2016 | 13 |
| Encrypt32Mfc.vcxproj.filters | Dec. 18, 2016 | 5 |
| Encrypt32MfcDlg.cpp | Dec. 20, 2016 | 77 |
| Encrypt32MfcDlg.h | Dec. 20, 2016 | 5 |
| EncryptDecrypt.cpp | Dec. 18, 2016 | 95 |
| EncryptDecrypt.h | Dec. 18, 2016 | 6 |
| LinearGen.cpp | Dec. 17, 2016 | 4 |
| LinearGen.h | Dec. 17, 2016 | 1 |
| LinearGenArray.cpp | Apr. 3, 2016 | 12 |
| LinearGenArray.h | Jan. 6, 2016 | 5 |
| LinearGenArrayHD.cpp | Dec. 20, 2016 | 12 |
| LinearGenArrayHD.h | Dec. 18, 2016 | 4 |
| LinearGenArraySB.cpp | Apr. 3, 2016 | 15 |
| LinearGenArraySB.h | Jan. 6, 2016 | 5 |
| md5.cpp | Dec. 6, 2015 | 13 |
| md5.h | Apr. 13, 2002 | 4 |
| Prime32Map.cpp | Dec. 17, 2016 | 9 |
| Prime32Map.h | Dec. 17, 2016 | 2 |
| RawKeyData.cpp | Feb. 26, 2016 | 9 |
| RawKeyData.h | Mar. 20, 2016 | 1 |
| ReadMe.txt | Nov. 28, 2015 | 6 |
| resource.h | Dec. 20, 2016 | 7 |
| stdafx.cpp | Nov. 28, 2015 | 1 |
| stdafx.h | Dec. 17, 2016 | 2 |
| targetver.h | Nov. 28, 2015 | 1 |
| Utility.cpp | Apr. 3, 2016 | 8 |
| Utility.h | Dec. 29, 2015 | 1 |

BACKGROUND

The present invention relates to cryptography and cryptographic systems. Several encryption methods are currently used in various fields. Cryptographic systems (cryptosystems) protect data, especially sensitive data, from being hacked, eavesdropped, or stolen by any unintended party. Cryptographic methods are also used for authentication between users, between various computer systems, and between users and the computer systems. Ideally, encryption transforms original input data into encrypted data that is impossible to read or decrypt without the proper key.

Cryptosystems can be classified in several manners, for example, classified into symmetric cryptosystems and asymmetric cryptosystems. Symmetric cryptography is also referred to as secret-key cryptography, which uses a single key (the secret key) to encrypt and decrypt information. Since there is only one key, it requires some form of secure key exchange (in person, by courier, and the like). Asymmetric cryptography is referred to as public-key cryptography, which uses a pair of keys: one (the public key) to encrypt data such as a message, and the other (the private key) to decrypt it.

The Advanced Encryption Standard (AES) is a specification for the encryption of electronic data established by the U.S. National Institute of Standards and Technology (NIST) in 2001. It has been adopted by the United States Government to protect non-classified and classified data and is used worldwide as one of the most well-known encryption standards. Versions of AES using 192 bit and 256 bit keys are also the only publicly accessible encryption methodologies that are approved by the National Security Agency (NSA) for top secret information.

AES uses a symmetric algorithm in which the same key is used for both encrypting and decrypting data. AES uses three alternative key lengths of 128 bits, 192 bits, or 256 bits. AES employs a block cipher where the original data ("plaintext") is divided up into blocks and each block is processed individually in multiple rounds (iterations) to produce encrypted data ("ciphertext"). The key size used for an AES cipher specifies the number of transformation rounds—10 rounds for 128-bit keys, 12 rounds for 192-bit keys, and 14 rounds for 256-bit keys.

Other conventional cryptographic algorithms and methods include, for example, cryptographic hash functions which are typically used for digitally signed messages, random number generators, one time pads, DES (Data Encryption Standard) that uses a 56-bit key size, triple DES which is a secure form of DES using a 158-bit key, International Data Encryption Algorithm (IDEA) which is a block-mode secret-key encryption algorithm using a 128-bit key, RC4 (widely used symmetric key algorithm), and the like.

Typically, code breakers or attackers try to find the right key to exploit a cryptosystem or view sensitive information. Code crackers typically employs as many as hundreds or thousands of computers to try millions of keys until the right key is discovered. This method of trying every possible key to attempt to decrypt the ciphertext is referred to as the brute force attack. Brute force attacks are often successful if weak keys or passwords are used, while they are difficult if long keys are used and if the keys consist of mixed numbers and characters in a nonsense pattern. A weakness in the system may reduce the number of keys that need to be tried. In addition, there are many other attacks such as analyzing encryption algorithms or finding a specific pattern in the cryptosystem.

Due to the continuous evolution of computer-based technology, security methods that have seemed unbreakable are becoming inadequate, for example, the 56-bit key size of DES is no longer considered secure against brute force attacks and the NIST has withdrawn DES as a standard. As performance of computers continues improving, there is an increasing necessity for a much more secure data transfer and storage mechanism. Cybersecurity experts believe that AES may have been broken by one or more governments around the world through either brute force or through cryptographic methodologies that may be faster than brute force.

Accordingly, it would be desirable to provide, on all levels from Government security to on-line transactions for the individual, a cryptosystem that is impossible to crack even though thousands of supercomputers may be used.

SUMMARY

An encryption specification named "MetaEncrypt" implemented as a method and associated apparatus is disclosed for unbreakable encryption of data, code, applications, and other information that uses a symmetric key for encryption/decryption and to configure the underlying encryption algorithms being utilized to increase the difficulty of mathematically modeling the algorithms without possession of the key. Data from the key is utilized to select several encryption algorithms utilized by MetaEncrypt and configure the algorithms during the encryption process in which block sizes are varied and the encryption technique that is applied is varied for each block. Rather than utilizing a fixed key of predetermined length, the key in MetaEncrypt can be any length so both the key length and key content are unknown. MetaEncrypt's utilization of key data makes it impossible to model its encryption methodology to thereby frustrate cryptographic cracking and force would be hackers to utilize brute force methods to try to guess or otherwise determine the key. However, by utilizing long key lengths, the combinatoric strength (i.e., the number of possible configurations that be utilized for a given encryption task) of MetaEncrypt is immense.

MetaEncrypt is specifically designed to frustrate brute force attacks, even those that may use massive arrays of computers that are orders of magnitude more powerful than those that presently exist. This is accomplished by leveraging the memory resources that are abundant in present day computers. Unlike conventional encryption techniques including AES that employ small keys using a relatively small memory footprint, MetaEncrypt can employ a key of virtually any length, limited only by the capacity of the computer on which it runs. Accordingly, current personal computers can readily use key lengths of tens or hundreds of millions. As key length increases, the security provided by Meta encrypt increases.

MetaEncrypt will frustrate even an attacker who has knowledge of the complete MetaEncrypt algorithm and who can inject known plain text into the generated data stream in an attempt to model the state of the MetaEncrypt encryption algorithm to thereby derive the key. MetaEncrypt can apply several techniques in various combinations to thwart attackers. For example, the algorithm state can be varied depending on length and content of the key data. The encryption techniques used for each block of data may vary depending on the key data. The size of each block of data may vary depending on key data. A varying amount of pseudo-random data may be discarded for each block depending on key data. Some pseudo-random data may be used to dynamically initialize secondary encryption techniques depending on key data. In addition, varying amounts of random data may be inserted between or into blocks depending on key data.

In various illustrative embodiments, MetaEncrypt can utilize large arrays of composite (i.e., hybrid) pseudo-random number generators to produce a stream of numbers that is practically indistinguishable from natural random numbers. In addition to providing pseudo-random numbers that are used in the MetaEncrypt algorithms, the arrays of composite generators can be utilized as a one-time pad in which a secret key of pseudo-random numbers as large or larger than the plain text is used to produce cipher text that is impossible to decrypt or break without the key.

An attacker is unable to infer the state of the pseudo-random number generator array because its design is obscured. Therefore, without the key, an attacker is unable to know the number of composite generators that are utilized in the array or the configuration of individual composite generators. For example, the size of the buffers used in the additive pseudo-random number generators and their initial values cannot be determined without the key. The size of the shuffle buffers used in the composite pseudo-random number generators and their initial values cannot be determined without the key. Without they key, an attacker cannot know the exact method used to choose and/or combine the outputs from the constituent pseudo-random numbers generators that are utilized in MetaEncrypt. In addition, the attacker cannot know how data is divided into blocks without the key.

An "encryption sandwich" technique may be utilized in MetaEncrypt in which pseudo-random number vectors are applied before and after secondary encryptions techniques that may include bit field re-encoding and/or bit field shuffling and/or other methods. This technique operates to obscure the output of the pseudo-random number generators arrays. Thus, even if known plain text could be injected into the input, use of the vectors obscures the output of the pseudo-random number generators.

Dynamic keys may be used for the secondary encryption bit field re-encoding and shuffling techniques or other encryption algorithms whereby the key data is taken from the composite pseudo-random number generator array. Because MetaEncrypt can use keys of varying size, some or the output of the pseudo-random number generator arrays might not be used for encryption and will not affect the output cipher text. Therefore, the amount of data taken from the composite pseudo-random number generator array depends on key data and not solely on the amount of plain text data being encrypted. The same file encrypted with a different key or starting at a different cycle count with the same key may thereby use a different number of cycles of the composite pseudo-random number generator array.

Some output from the composite pseudo-random number generator array may also occasionally be discarded. The amount discarded is determined from a prior pseudo-random number generator output and thus is derived from key data. Discarding output means that some of the output of the generator will not be observable by directly affecting the output cipher text without the performance penalty of using a dynamic key.

Random values may be also be occasionally injected into the output cipher text data stream. Without the key, the attacker cannot know where the random values are injected into the encryption process, how many values are injected, or the way they are injected. Such random number injection may further complicate attempts by attackers to infer the state of a pseudo-random generator array. Random value injection will also cause the output data stream to have more data than the input data stream by some indeterminate number of bytes thus the amount of plain text cannot be determined without the key. For example, one or more random values may be injected into the output stream between packets or injected into packets where less input plain text is included in the packet to make room for the random values.

Different combinations of the above-described techniques may be utilized for different implementations. Even a small subset of techniques will typically be effective to deter an attacker from knowing the underlying state of the MetaEncrypt algorithm even when injecting known plain text into the input data stream.

DESCRIPTION OF THE DRAWINGS

FIG. 5 shows an illustrative logical operation comprising an exclusive OR

Like reference numerals indicate like elements in the drawings. Elements are not drawn to scale unless otherwise indicated.

DETAILED DESCRIPTION

MetaEncrypt is described in the text below using multiple embodiments and drawings. A given implementation of MetaEncrypt can be constructed using various combinations of the components, techniques, and methods in the description below to meet particular needs and thereby strike a desired balance of factors which may often be competing. For example, MetaEncrypt can be designed for lightweight applications that have more constrained resources by deleting the utilization of some components and/or techniques which are noted as optional in the description below. Other combinations of component and techniques may be utilized in other implementations where it is desired to optimize execution speed. In addition, other types of pseudo-random number generators may be utilized, as discussed below. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

Figure 1:
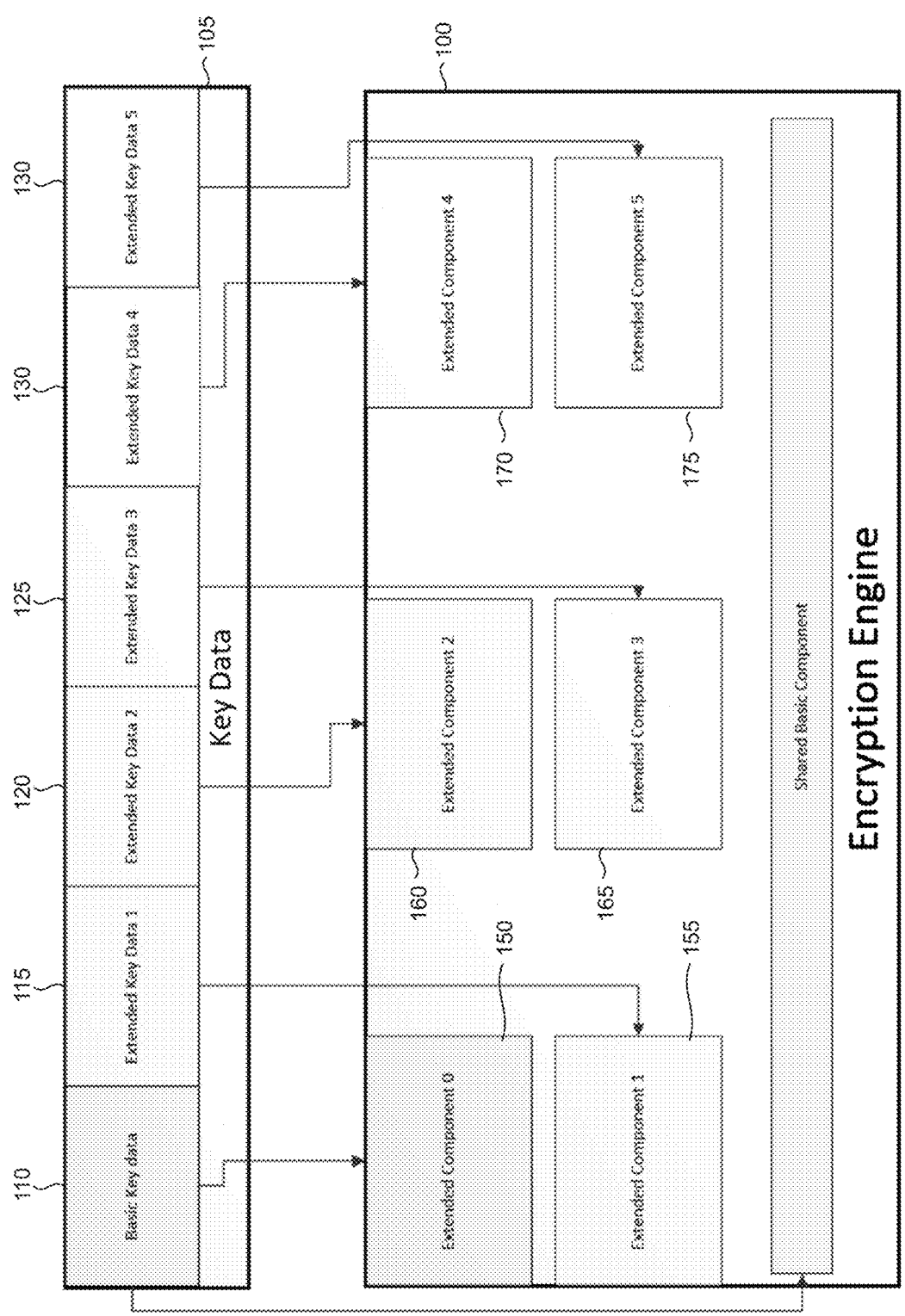
FIG. 1 is an illustrative diagram that shows how key data is utilized to configure components in the MetaEncrypt encryption engine.
Figure 2:
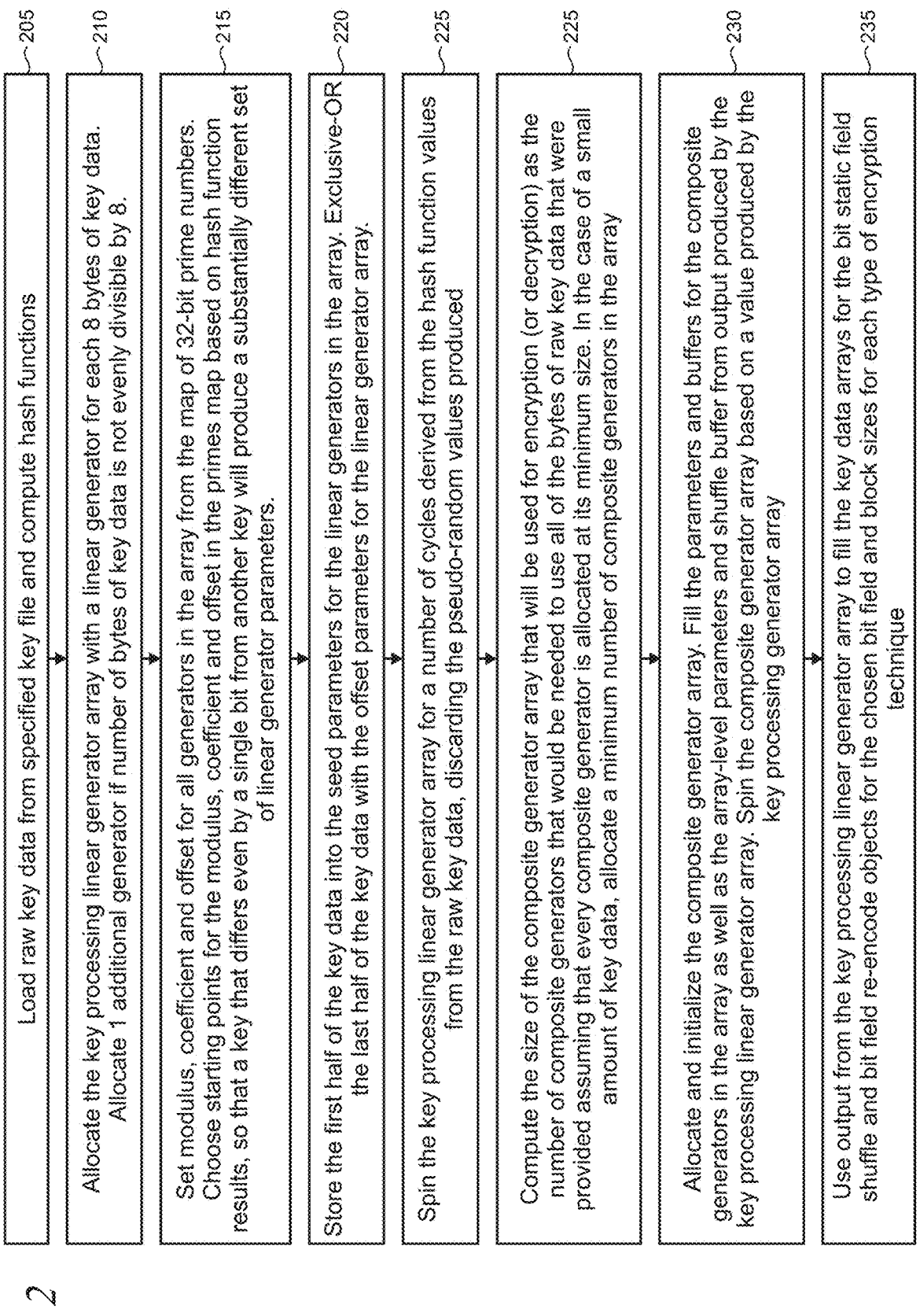
FIG. 2 is an illustrative flowchart that shows how key data is pre-processed in the encryption engine.

FIG. 1 is an illustrative diagram that shows how key data 105 is utilized to configure components in the MetaEncrypt encryption engine 100. The key data includes basic key data 110 that is mapped to an extended component 0 (indicated by reference numeral 155) in the encryption engine. The key data 105 may be extended, as respectively indicated by reference numerals 115, 120, 125, and 130. Each instance of extended key data is respectively mapped to an extended component, as respectively indicated by reference numerals 155, 160, 165, 170, and 175. In this way MetaEncrypt can utilize any amount of key data up to the amount of available memory, adding additional components as the amount of key data increases. The shared basic component in the encryption engine represents a set of static tables for shuffle and re-encoding, as described below. In some implementations, more sets of static tables for shuffle and re-encode may be utilized particularly, for example, as the key size increases. In other implementations, a single set of static tables may be utilized and the size of the composite pseudo-random number generator array, as described below, can be increased FIG. 2 is an illustrative flowchart 200 that shows how the key data 105 (FIG. 1) is pre-processed in the encryption engine 100. Unless specifically stated, the methods or steps shown in the flowcharts contained herein and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

The key data pre-processing may be optionally utilized when a high-quality key is available. The encryption engine 100 could be initialized by reusing the key data as many times as necessary. Key data processing has a number of goals One goal is to extend the key data to initialize the encryption/decryption engine state so that it can be much larger than the key. A second goal is to convert a "bad" key (e.g., one that is a repetition of constant data or that is very short) into one having a larger and/or varying number of pseudo-random values. This can be done so that it will not be apparent that plain text has been encrypted with a "bad" key. A third goal is to produce substantially different processed data for keys that differ by as little as a single bit.

In step 205, raw key data from is loaded from some specified key file. The key data is subjected to a cryptographic hash function that provides a hash value. In step 210, an allocation of linear pseudo-random number generators (described below) is provided to process the key data using an array. For example, a pseudo-random number linear generator may be allocated for each 8 bytes of key data. An additional linear pseudo-random number generator if number of bytes of key data is not evenly divisible by eight.

In step 215, linear pseudo-random number generator parameters are set, including modulus, coefficient and offset for each of the generators in an array, utilizing the map of 32-bit prime numbers. The starting points for the modulus, coefficient and offset parameters in the primes map may be based on hash function values. Thus, a key that differs even by a single bit from another key will produce a substantially different set of linear pseudo-random number generator parameters. Not all of modulus, coefficient, and offset parameters values will not necessarily be prime: for instance, the modulus and coefficient may be prime but the offset may be non-prime. Since this pseudo-random number generator array is not used to provide very large amounts of data, it is not necessary to choose modulus, coefficient and offset parameters that satisfy the constraints of the Hull-Dobel theorem, which guarantees a maximal period for a linear pseudo-random number generator. Selecting linear pseudo-random number generator parameters by other means allows for more variation in linear pseudo-random number generator parameters.

In step 220, the first half of the key data is stored into the seed parameters for the linear pseudo-random number generators in the array. A logical exclusive-OR function is applied to the remaining half of the key data with the offset parameters for the linear pseudo-random number generators in the array. In step 225, the linear pseudo-random number generator array used for key data processing is subjected to spinning for a number of cycles derived from the hash function values of the raw key data. The pseudo-random number produced by spinning the array are discarded.

In step 225, a size of a composite pseudo-random number generator array (described below) that is used for encryption and/or decryption is computed as the number of composite generators that are needed to use all of the bytes of raw key data. This computation assumes that every composite pseudo-random number generator is allocated at its minimum size. In the case of a small amount of key data, some minimum number of composite pseudo-random number generators in the array may be allocated. Also, the number of composite pseudo-random number generators may be increased by a variable amount based on a value derived from the contents of the key data so that the number of composite pseudo-random number generators does not correspond exactly to the amount of key data provided.

In step 230, the composite pseudo-random number generator array is allocated according to the computed number. The composite pseudo-random number generator array is initialized by filling the parameters and buffers for the composite pseudo-random number generators in the array using output produced by the key processing linear pseudo-random number generator array. Array-level parameters and shuffle buffer parameters are also filled using the output. The composite pseudo-random number generator array is subjected to spinning based on a value produced by the key processing linear pseudo-random number generator array. In step 235, output from the key processing linear pseudo-random number generator array is used to fill the key data arrays for bit static field shuffle and bit field re-encode objects (described below) for the chosen bit field and block sizes for each type of encryption technique.

Figure 3:
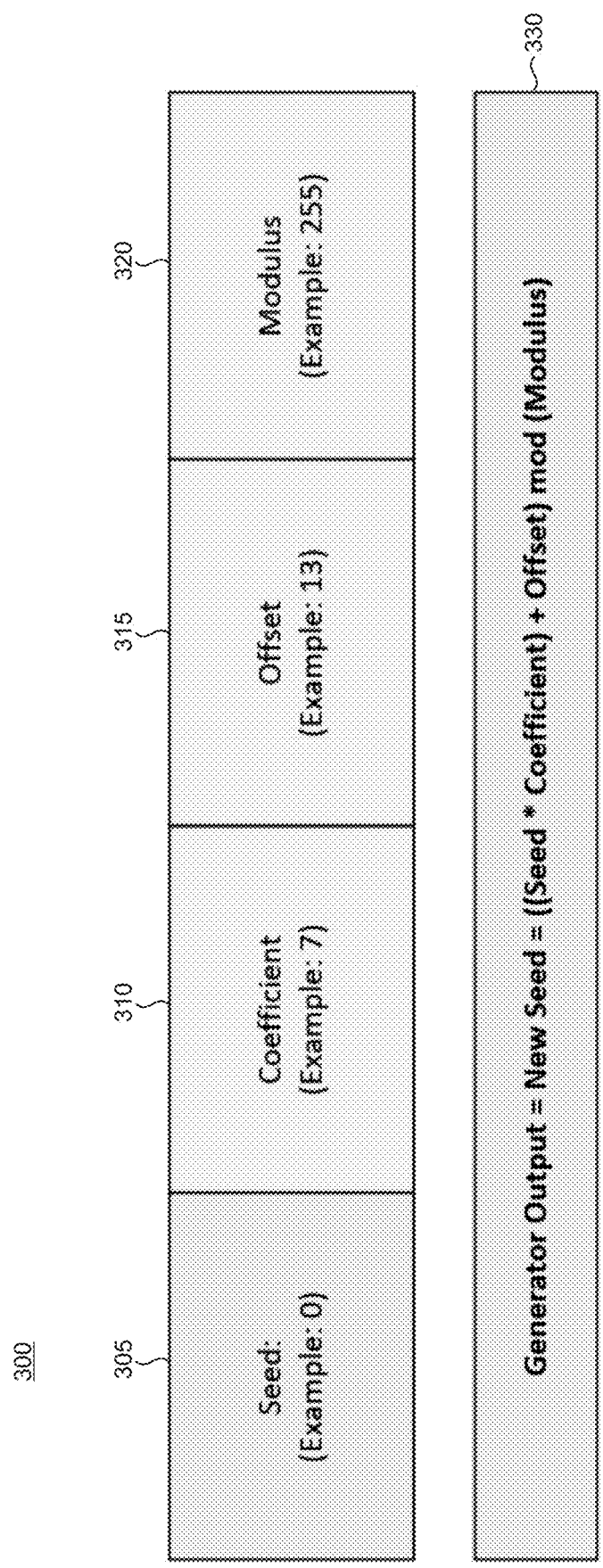
FIG. 3 shows an illustrative linear pseudo-random number generator.

FIG. 3 shows an illustrative linear pseudo-random number generator 300 that may also be referred to as a linear congruential pseudo-random number generator. The linear pseudo-random number generator uses a seed 305 and is operated with parameters including coefficient 310, coefficient 315, offset 320 and modulus 325. Exemplary seed and parameters are shown in the drawing. The linear pseudo-random number generator may typically be operated in an iterative manner to generate values at a generator output 330. For example, using the exemplary values:

Iteration 1: output=(0*7+13)mod(255)=13
Iteration 2: output=(13*7+13)mod(255)=91
Iteration 3: output=(91*7+13)mod(255)=140
Iteration 4: output=(140*7+13)mod(255)=228
Iteration 5: output=(228*7+13)mod(255)=79
Iteration 6: output=(79*7+13)mod(255)=176

A linear pseudo-random number generator produces a sequence of values that sooner or later repeats. The period of a linear pseudo-random number generator is the number of values produced before the sequence begins to repeat.

Other types of pseudo-random number generators could be used in place of linear pseudo-random number generators, if a large number of different pseudo-random number generators may be constructed by varying parameters. For linear pseudo-random number generators these parameters include modulus, coefficient, and offset. For 32-bit values, the possible different generators are 4 billion cubed or 64 times 10 to the power 27. Even if these parameter values are constrained to guarantee better pseudo-random number generators, the number of possibilities can still be more than 10 to the power 20. This supports the building of pseudo-random number generator arrays that can be initialized with key data, at the very least using key data for the seed values for the generators. A reasonably long average period for individual pseudo-random number generators and a mathematical theorem that guarantees a long period for some choices of parameters, as with the Hull-Dobel theorem for linear pseudo-random number generators is also generally desirable.

When any previously generated value is reproduced, the series repeats. Typically, linear congruential pseudo-random number generators use 32-bit values and a large modulus, for example 4295967295. With well-chosen modulus, coefficient and offset values, a 32-bit linear congruential pseudo-random number generator can produce a sequence that does not repeat until after more than 4 billion iterations. The largest possible period of a linear pseudo-random number generator is 2 to the power of the number of bits used for the values; for a 32-bit pseudo-random number generator this is 2 to the power 32 or 4,294,967,296. The maximum period is further limited by the modulus. Not all choices of coefficient and offset parameter values produce maximal periods. For instance, a coefficient of 1 and an offset of 0 produce the same value over and over again. If modulus, coefficient, and offset parameters are chosen which comply with the constraints of the Hull-Dobel Theorem, a linear pseudo-random number generator will have a maximal period. Other parameter choices may also produce maximal periods, but that is not guaranteed by this theorem. The Hull-Dobel theorem makes use of prime numbers to guarantee long periods.

Figure 4:
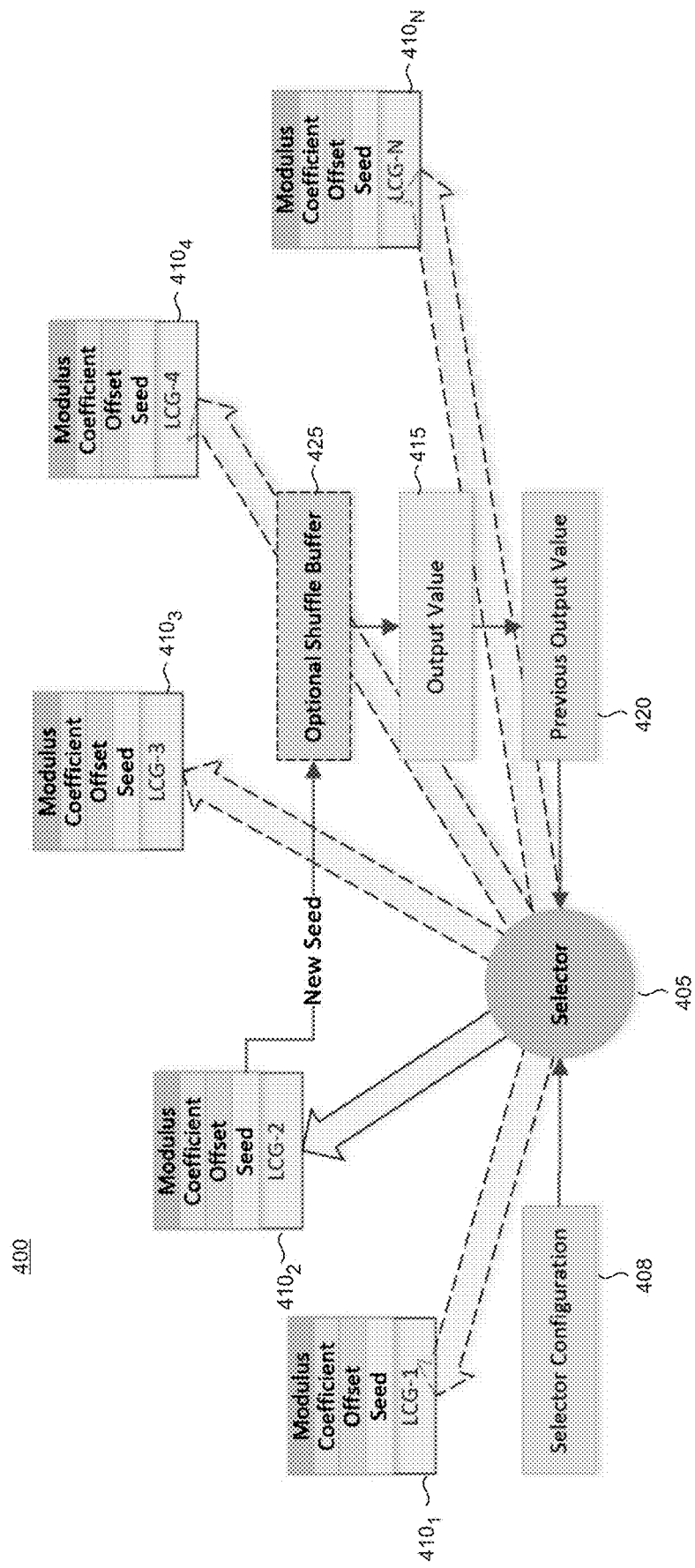
FIG. 4 shows an illustrative array of linear pseudo-random number generators.

FIG. 4 shows an illustrative array 400 of linear pseudo-random number generators. A linear pseudo-random number generator array consists of two or more linear pseudo-random number generators $410_{1 \ldots N}$ and a selector 405 for selecting the next linear pseudo-random number generator to use to produce a requested output value 415. The selector uses key-derived selector configuration data 408 as well as a previous output value 420 to determine which linear pseudo-random number generator to use each time it executes. The selector 405 determines the length of the sequence of pseudo-random numbers that can be produced by the array 400. For example, simply moving from the first linear pseudo-random number generator to the last and then back to the first, and so on, might produce an overall period of only 20 billion for 5 generators, each with a sequence 4 billion values long. However, if the selector makes the determination of which generator to use in a more complex way, for example based on the previous output value 420 as shown, it is possible to produce a greatly extended sequence, effectively multiplying the periods of the component pseudo-random number generators. In addition to a longer sequence, the array 400 of linear pseudo-random number generators produces better random numbers than a single linear generator, partly because it is possible to repeat a number without restarting its sequence. Using a shuffle buffer 425, as discussed below in the description accompanying FIG. 9, can also improve apparent "randomness."

FIG. 5 shows an illustrative logical operation comprising an exclusive-OR function 500. As noted above in step 220 of the flowchart 200 for key data processing, the first half of the key data is stored into the seed parameters for the linear pseudo-random number generators 410 (FIG. 4) in the array 400. To perform an exclusive-OR logical operation on two bits, a determination is made as to whether they are the same or different bits. If they are the same, the result is 0. If different, the result is 1. Exclusive-OR has the property that if the operation is performed twice with the same vector, the original values are reproduced. Encryption techniques are not theoretically unbreakable when using pseudo-random numbers because it is conceivable that an attacker could infer the state of the pseudo-random number generator and then be able to decrypt intercepted messages from that point forward. Nevertheless, encryption using exclusive-OR with pseudo-random values can be strong encryption and virtually unbreakable with any conceivable supercomputer array in any useful amount of time. MetaEncrypt makes inferring the state of its constituent pseudo-random number generators extremely difficult in many ways, starting by using a very large and complex state for generating pseudo-random numbers and by combining exclusive-OR with other encryption techniques.

As shown, an exemplary plain text string 505 is represented as a bit string 510. An exclusive-OR operation is performed on a vector of pseudo-random numbers 515 with the plain text bit string to produce bit string of cipher text 520 which is used as an output 525, for example, as offset parameters for the linear pseudo-random number generators 410 (FIG. 4) in the array 400.

Figure 6:
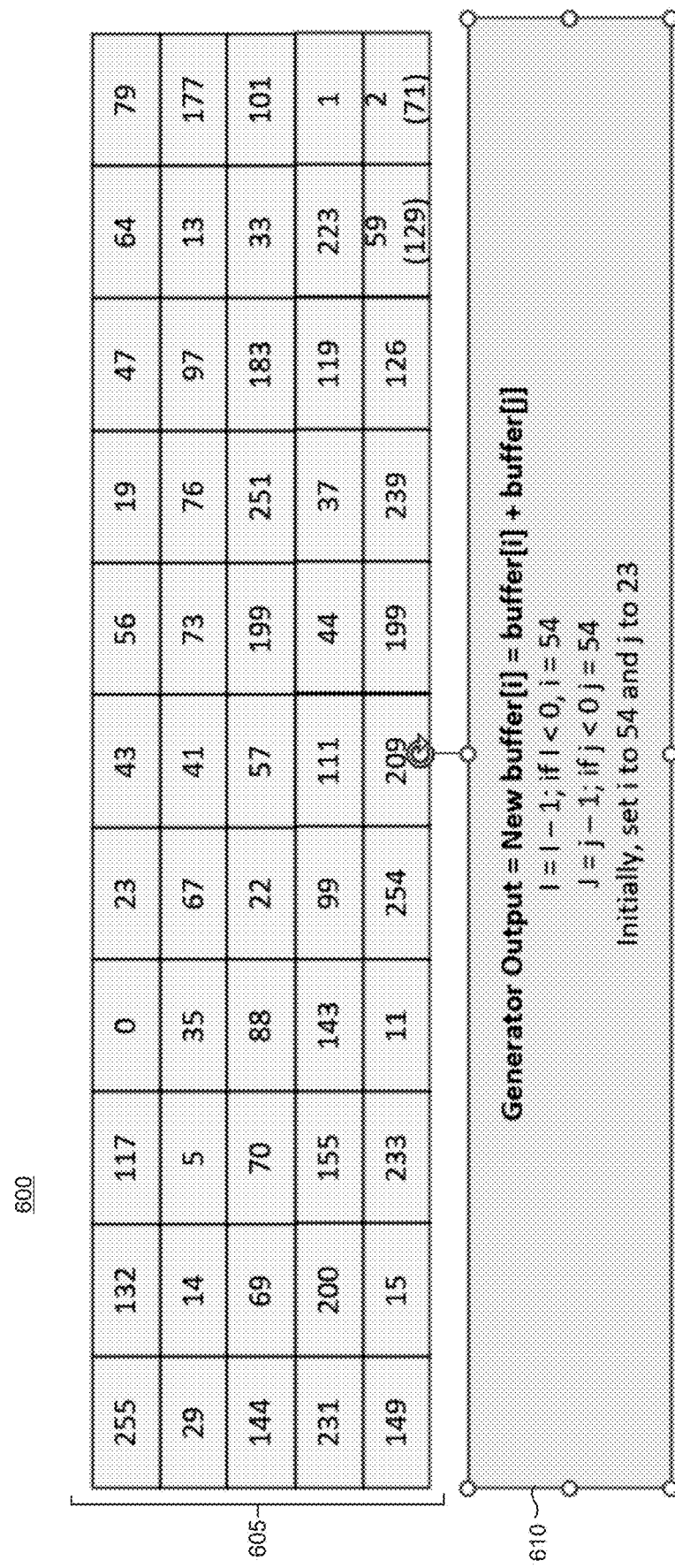
FIG. 6 shows an illustrative additive pseudo-random number generator.

FIG. 6 shows an illustrative additive pseudo-random number generator 600 which may be implemented as an additive lagged Fibonacci generator. Using an exemplary 55-element buffer 605, an additive pseudo-random number generator can produce a very long sequence. It is possible for the same value to be reproduced without necessarily starting to repeat all previous values which desirably increases apparent "randomness." In practice there are many possible configurations for additive generators with different buffer sizes and different initial choices for i and j. Buffers can also be made using different size elements, for instance 8 bits, 16 bits, 32 bits or 64 bits. An additive pseudo-random number generator typically has a large state compared to a linear congruential generator. If this example were implemented with 32-bit elements it would have a state that is 57*4=228 bytes long. This large state can be filled with or influenced by key data in cryptographic applications. Another pseudo-random number generator type could be used instead of an additive pseudo-random number generator if it has a large state that can be filled with key data. There are multiple possible configurations of parameters and buffer size and a theorem that may be utilized in a given implementation which provide long periods for certain combinations of parameters and buffer size. Properly configured additive pseudo-random number generators have extremely long periods. There are many conventional pseudo-random number generators that are known to have long periods. For additive pseudo-random number generators the parameters, in addition to buffer size, are the initial values of the two indices, which are 54 and 23 in this illustration.

The additive pseudo-random number generator 600 may typically be operated in an iterative manner to generate values at a generator output 610. For example, using the exemplary initial values of i set to 54 and j set to 23:
Iteration 1: output=buffer[54]+buffer[23]=2+69=71; buffer[54]=71; i=53; j=22
Iteration 2: output=buffer[53]+buffer[22]=59+70=129; buffer[53]=129; i=53; j=22

Figure 7:
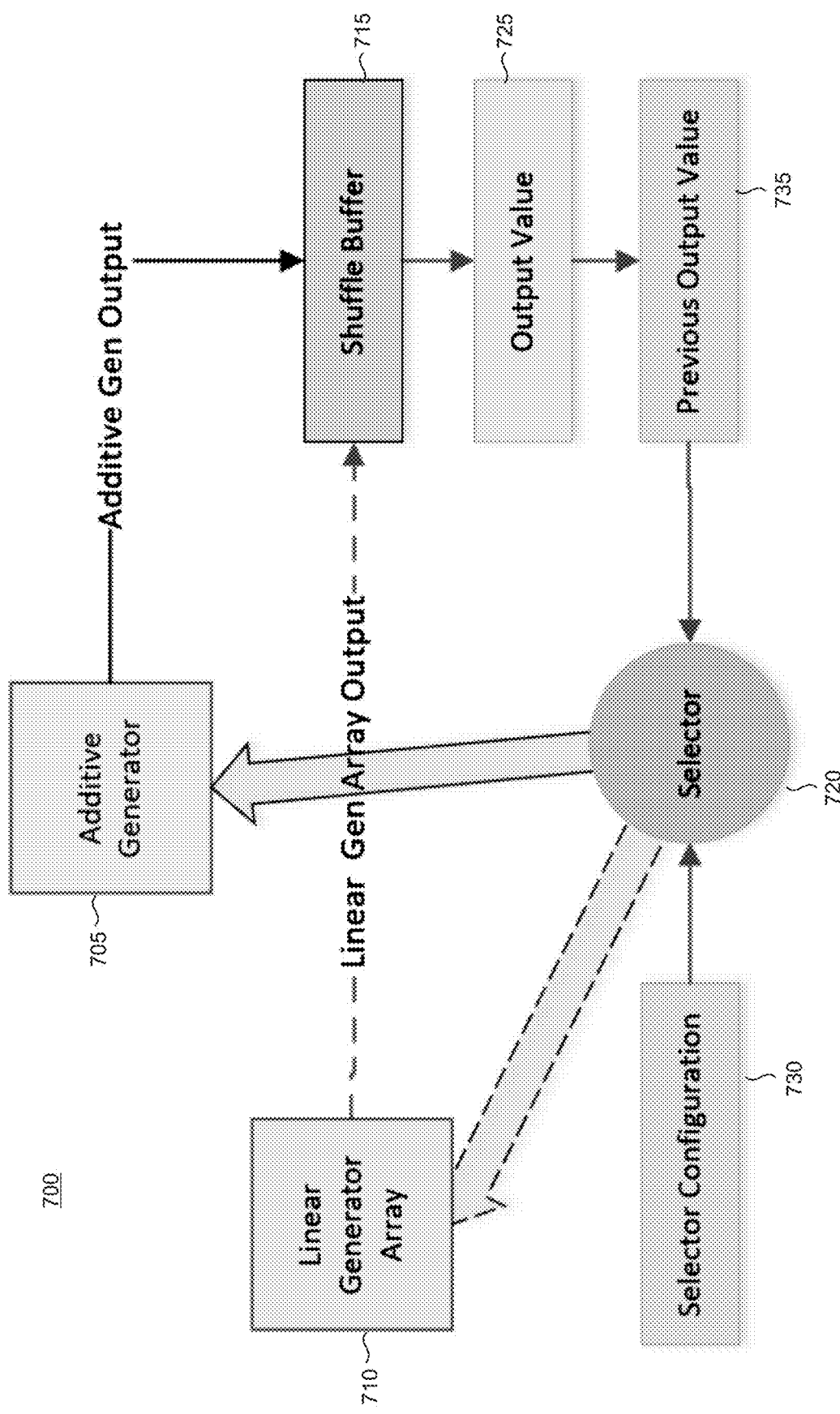
FIG. 7 shows an illustrative composite pseudo-random number generator that comprises an additive pseudo-random number generator and an array of linear pseudo-random number generators.

FIG. 7 shows an illustrative composite pseudo-random number generator 700 that comprises an additive pseudo-random number generator 705, an array of linear pseudo-random number generators 710, an optional shuffle buffer 715 and a selector 720. Removing the shuffle buffer can reduce the memory use and improve the execution speed in some cases. In alternative implementations, a shuffle buffer may be selectively utilized based on key-derived data. The selector chooses either the linear generator array or the additive generator to produce an output value 725. The selector uses key-derived configuration data 730 as well as a previous output value 735 to determine which generator to use each time it executes. In addition to the selector configuration, virtually all aspects of a composite generator may be configured from key data including a number of linear generators in the array and their parameters (e.g., modulus, offset, and coefficient), the size of the additive generator and initial contents of its buffer, the size of the shuffle buffer if present, and the initial contents of the shuffle buffer in some cases. In scenarios in which guaranteed long periods are desired for individual pseudo-random number generators in the linear pseudo-random number generator array 710, the parameters for those generators may be selected to comply with the constraints of the Hull-Dobel theorem. Composite pseudo-random number generators may be constructed using different types of pseudo-random number generators and or arrays of pseudo-random number generators than the linear and additive pseudo-random number generators used in this illustrative example. More than two types of pseudo-random number generators could be employed. Classical encryption techniques such as AES can be utilized to generate pseudo-random numbers, adding to the list of pseudo-random number generator types that could be used instead of or in addition to linear and additive pseudo-random number generators. A possible disadvantage of pseudo-random number generators other than linear and additive pseudo-random number generators can be higher operation counts for generating an output pseudo-random number, resulting in longer encrypt/decrypt times.

Figure 8:
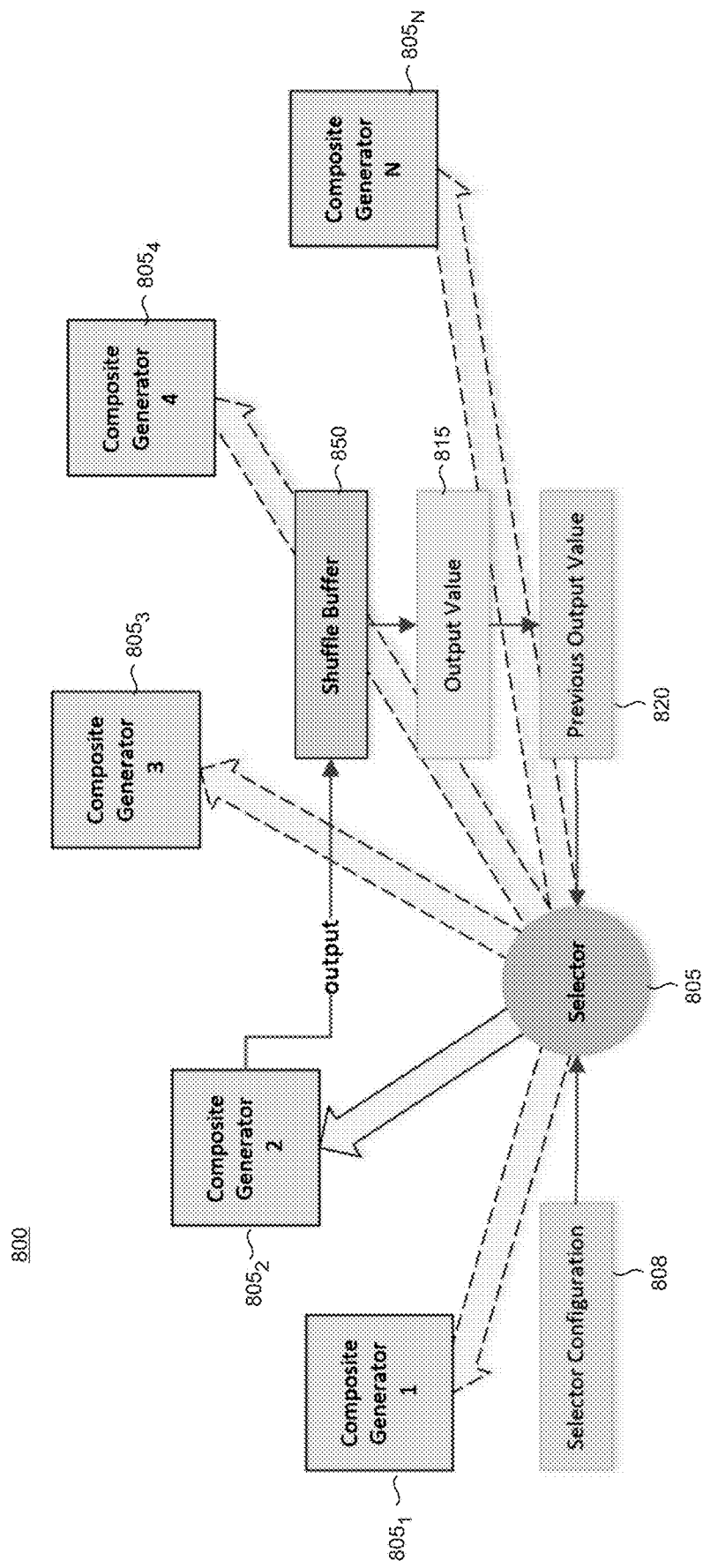
FIG. 8 shows an illustrative array of composite pseudo-random number generators.

FIG. 8 shows an illustrative array 800 of composite pseudo-random number generators comprising two or more composite generators 805 1 . . . N, an optional shuffle buffer 850, and a selector 810 for picking the next composite pseudo-random number generator to use to produce a requested output value 815. The selector uses key-derived selector configuration data 808 as well as a previous output value 820 to determine which composite pseudo-random number generator to use each time it executes.

A single composite pseudo-random number generator can produce an incredibly long sequence, possibly on the order of 10 to the power 100 values long. A composite pseudo-random number generator array puts these together in such a way as to multiply their periods. An extremely long sequence of pseudo-random numbers is almost a secondary purpose, however. The primary purpose of the composite pseudo-random number generator array 800 is to provide a way to use any amount of key data to make a random number generator that produces a sequence drawing from all of the provided key data. That is, the key data is used not only to set generator parameters and fill buffers but also to configure the generators. Without the key data used to create a composite pseudo-random number generator array, it is effectively impossible for an attacker to model the state of the composite pseudo-random number generator array due to its extremely large number of possible configurations.

Figure 9:
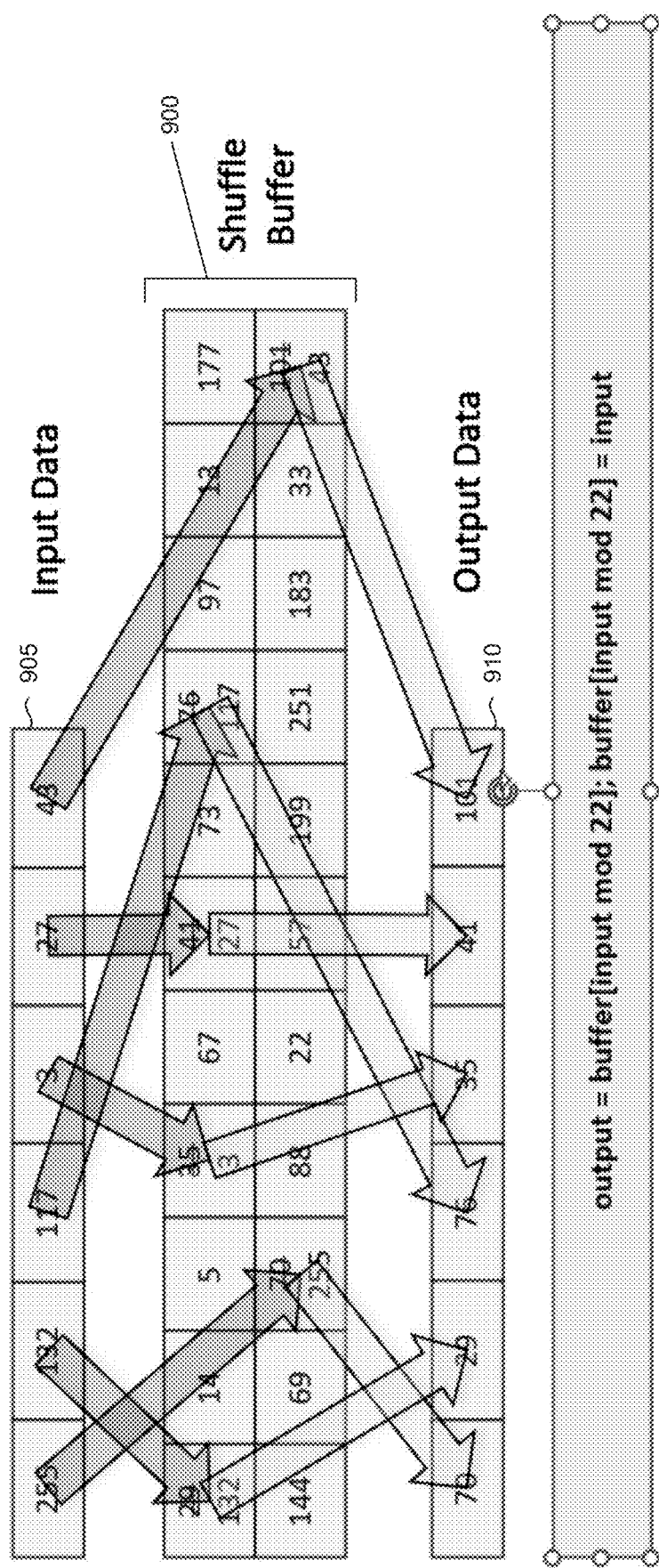
FIG. 9 shows an illustrative shuffle buffer.

FIG. 9 shows an illustrative shuffle buffer 900 which is configured to compute the modulus of the input value with the size of the shuffle buffer. (In this example the shuffle buffer size is 22 elements). The value in that shuffle buffer element becomes the output and the value in the shuffle buffer element is replaced by the input value. This has the effect of obscuring the calculation that produced the input value. An old input will become an output value if and when a new input value goes into the same shuffle buffer element. A shuffle buffer can be any size and can contain elements of any size, for instance bytes, 16-bit words or 32-bit words. Used with a pseudo-random number generator, a shuffle buffer element would have the same word size as the values produced by the random number generator.

The shuffle buffer 900 is operated iteratively, using successive pseudo-random values produced by a pseudo-random number generator such as a linear pseudo-random number generator array, composite pseudo-random number generator or composite pseudo-random number generator array as the input values. Using the exemplary shuffle buffers size of 22 with input data 905 produces output data 910:

Iteration 1: output=buffer[255 mod 22]=buffer[13]=70; buffer[13]=255
Iteration 2: output=buffer[132 mod 22]=buffer[0]=29; buffer[0]=132
Iteration 3: output=buffer[117 mod 22]=buffer[7]=76; buffer[7]=117
Iteration 4: output=buffer[3 mod 22]=buffer[3]=35; buffer[3]=3
Iteration 5: output=buffer[27 mod 22]=buffer[5]=41; buffer[5]=27
Iteration 6: output=buffer[43 mod 22]=buffer[21]=101; buffer[21]=43

Figure 10:
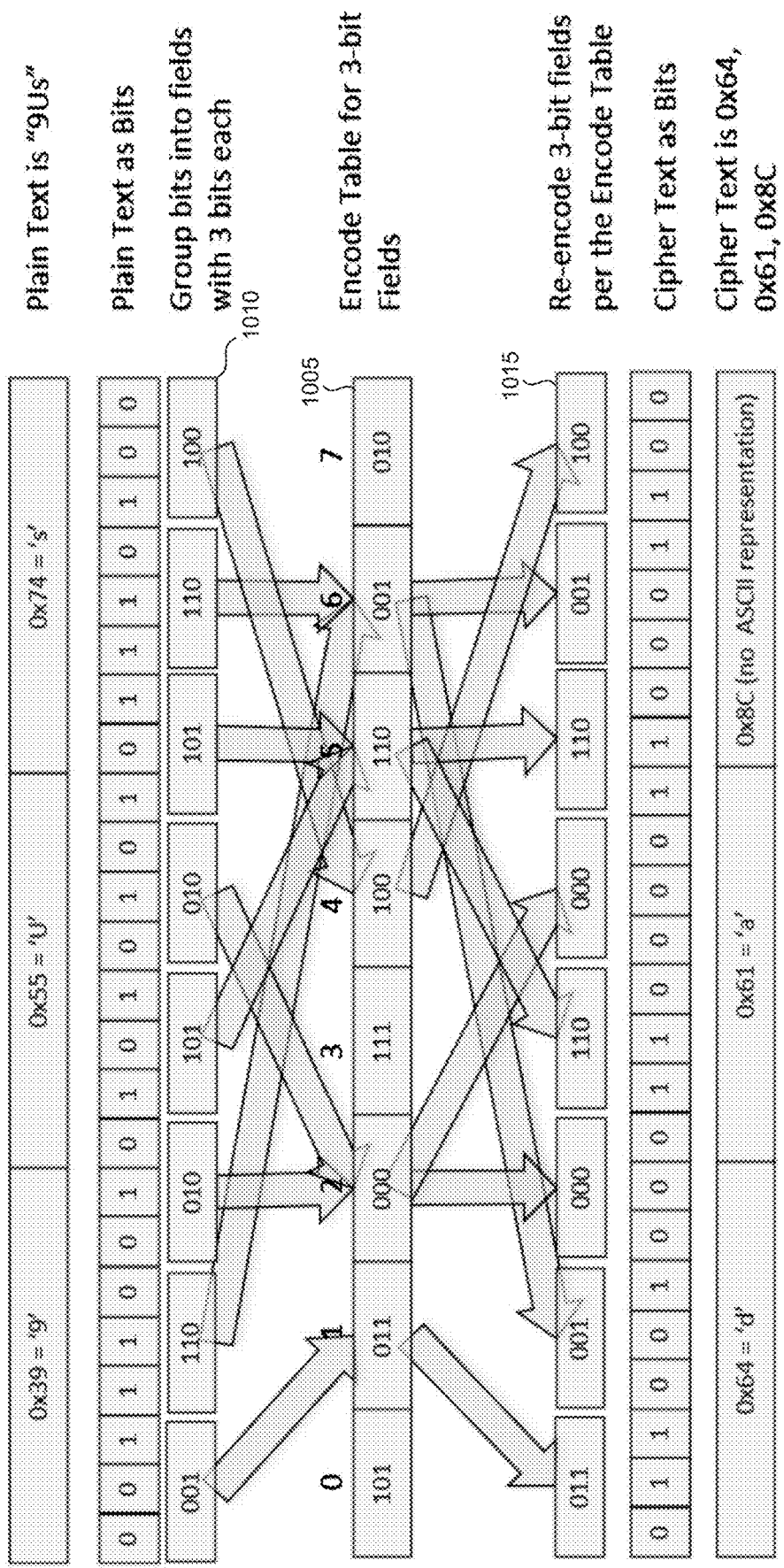
FIG. 10 shows an illustrative bit field re-encode process.

FIG. 10 shows an illustrative bit field re-encode process in which a possibly new value is assigned to each bit field, depending on the contents of an encode table 1005, the values in which are derived from key data. Re-encoding is done by using the value of the source bit field 1010 to find a position in the encode table and then taking the value at that position in the encode table as the value for the destination bit field 1015. The first bit field has value 001, which maps to the second element in the encode table, so the first bit field gets the new value 011. It is noted that some encode table elements are used more than once and some are not used at all. This is because some of the source bit fields have the same values.

It is also noted in this illustrative example that the last bit field happened to get the same value in this re-encoding operation. Larger bit fields may require larger encode tables. An encode table for an 8-bit field has 256 elements, whereas illustrative encode table 1010 for 3-bit fields has only 8 elements. There are 8! (40320) different encode tables for 3-bit fields. There are 256! (about 8.57 times 10 to the power 506) different Encode Tables for 8-bit values. MetaEncrypt uses different bit field sizes for re-encode operations depending on key-derived data and the size of the block that is being encrypted. As with bit field shuffle discussed below in the text accompanying FIG. 11, bit field sizes are chosen that evenly divide into the block size, but this is typically not a requirement for strong encryption. It is possible to use any bit field sizes less than or equal to the block size and then either leave the left-over bits in the input block unchanged or do some special operation on them.

Figure 11:
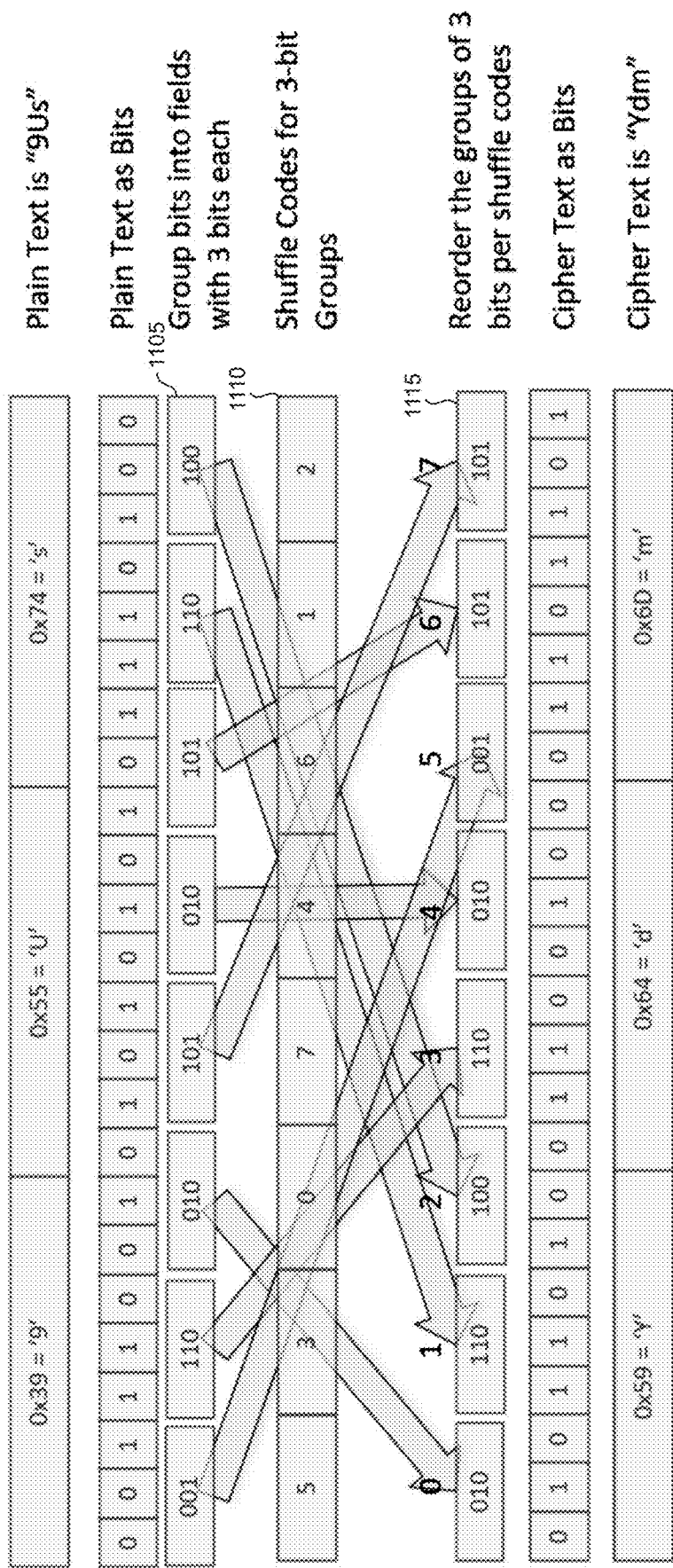
FIG. 11 show an illustrative bit field shuffle process.

FIG. 11 show an illustrative bit field shuffle process. Shuffling bit fields can be an effective encryption technique, especially in combination with other techniques such as exclusive-OR with a pseudo-random number vector and bit field re-encoding. A block of data can be broken into input bit fields 1105 of any length that that is smaller than the block size, but it may be convenient to only use bit field sizes that evenly divide the block size. If a bit field size does not evenly divide the block size, the left-over bits in the input block may either be left unmodified or some special operation may be applied to them. Key data can be converted into shuffle codes 1110 and those codes used to re-arrange the bit fields in a block as an output 1115. Any block that is an integral number of bytes can be broken evenly into bit fields of the following lengths: 1, 2, 4 and 8. The number of possible rearrangements of bit fields in a block becomes very large as the size of the block increases. There are 88! (about 1.85 times 10 to the power 134) possible rearrangements of 3-bit fields in a 33-byte block (with 33*8=264 bits). A bit field of size 1-bit provides the largest number of rearrangements. However, using different bit field sizes for different blocks provides algorithmic variation and can still provide strong encryption when combined with other techniques. MetaEncrypt chooses a bit field size for shuffling a particular block based on a pseudo-random number for that block that is derived from key data, in addition to the size of the block.

Figure 12:
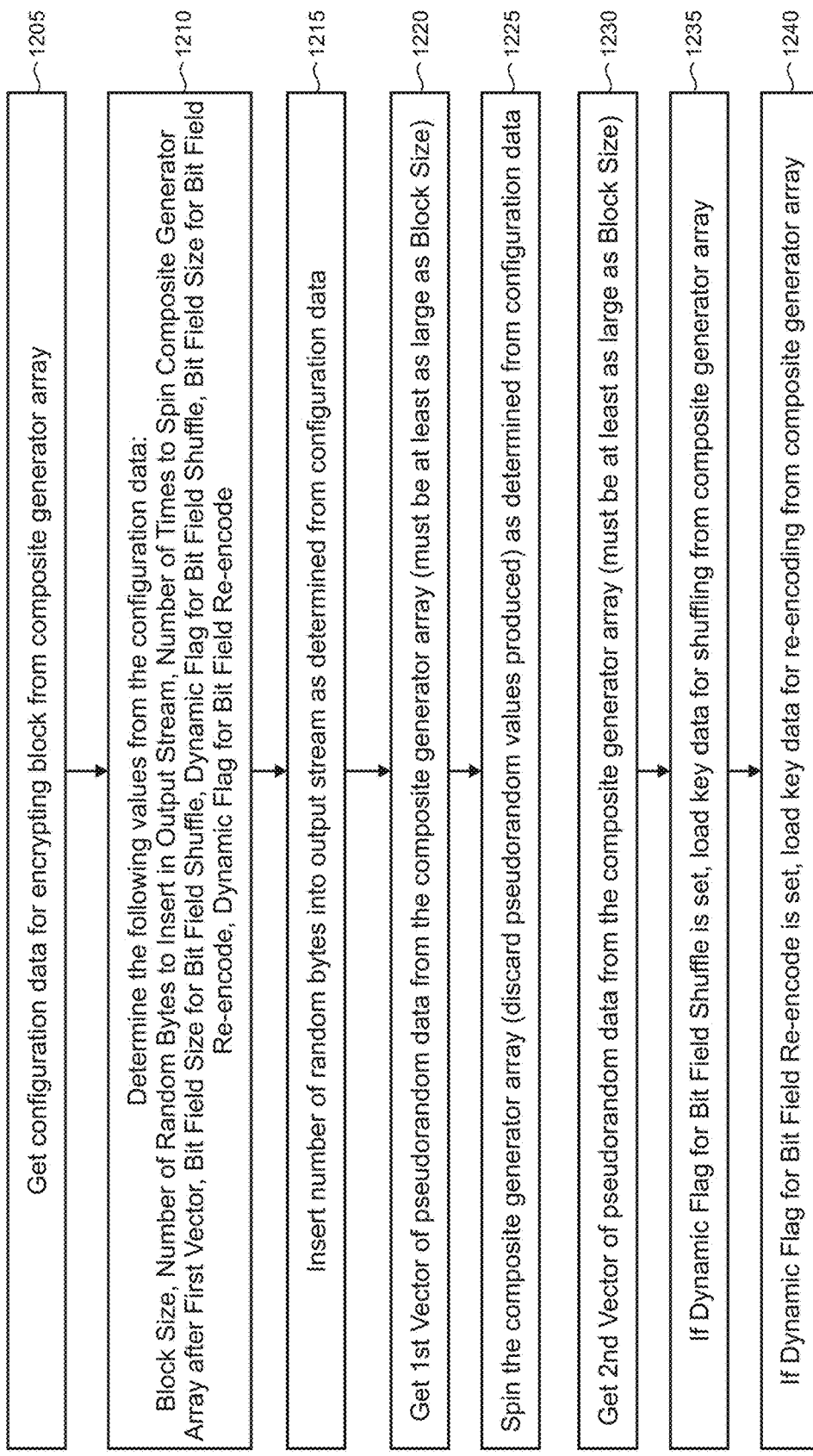
FIG. 12 is an illustrative flowchart for preparing to encrypt a block of plain text into cipher text using MetaEncrypt; the complete encryption process is FIG. 12 followed by FIG. 13.

FIG. 12 is an illustrative flowchart 1200 for preparing to encrypt a block of plain text using MetaEncrypt that may be performed by the encryption engine 100 (FIG. 1). The encryption is completed in FIG. 13, producing the output cipher text. In step 1205, configuration data is obtained from the composite pseudo-random number generator array 800 (FIG. 8). The following values are determined from the configuration data in step 1210: Block Size, Number of Random Bytes to Insert in Output Stream, Number of Times to Spin Composite Generator Array after First Vector, Bit Field Size for Bit Field Shuffle, Dynamic Flag for Bit Field Shuffle, Bit Field Size for Bit Field Re-encode, Dynamic Flag for Bit Field Re-encode. If a MetaEncrypt implementation uses a simplified "encryption sandwich" as in FIG. 13 with one or more elements not present, the preparation step(s) corresponding to removed element(s) are not necessary.

In step 1215, a number of random bytes is inserted into the output stream as determined from configuration data. In step 1220, a first vector of pseudo-random number data is obtained from the composite pseudo-random number generator array 800 (FIG. 8). The first vector must typically be at least as large as the block size of plain text that is being encrypted. In step 1225, the composite pseudo-random number generator array is subjected to spinning as determined from configuration data, where the pseudo-random values that are produced are discarded. In step 1230, a second vector of pseudo-random number data is obtained from the composite pseudo-random number generator array. The second vector must typically be at least as large as the block size of plain text that is being encrypted.

In step 1235, If a dynamic flag for a bit field shuffle operation is set, then key data is loaded for shuffling from the composite pseudo-random number generator array 800. In step 1240, if a dynamic flag for bit field re-encode is set, then key data is loaded for re-encoding from the composite pseudo-random number generator array 800. Bit field re-encoding and shuffling are respectively described above in the text accompanying FIGS. 10 and 11. Processing time to dynamically load key data can be substantial. If execution speed is important in a particular implementation, dynamic tables may be used rarely or not at all. Using multiple sets of static re-encode and shuffle tables can increase variability without the speed penalty of dynamic key loading. The processing time to load key data for additional sets of tables would increase the time to initially load a MetaEncrypt key instead of increasing the encryption and decryption time.

Figure 13:
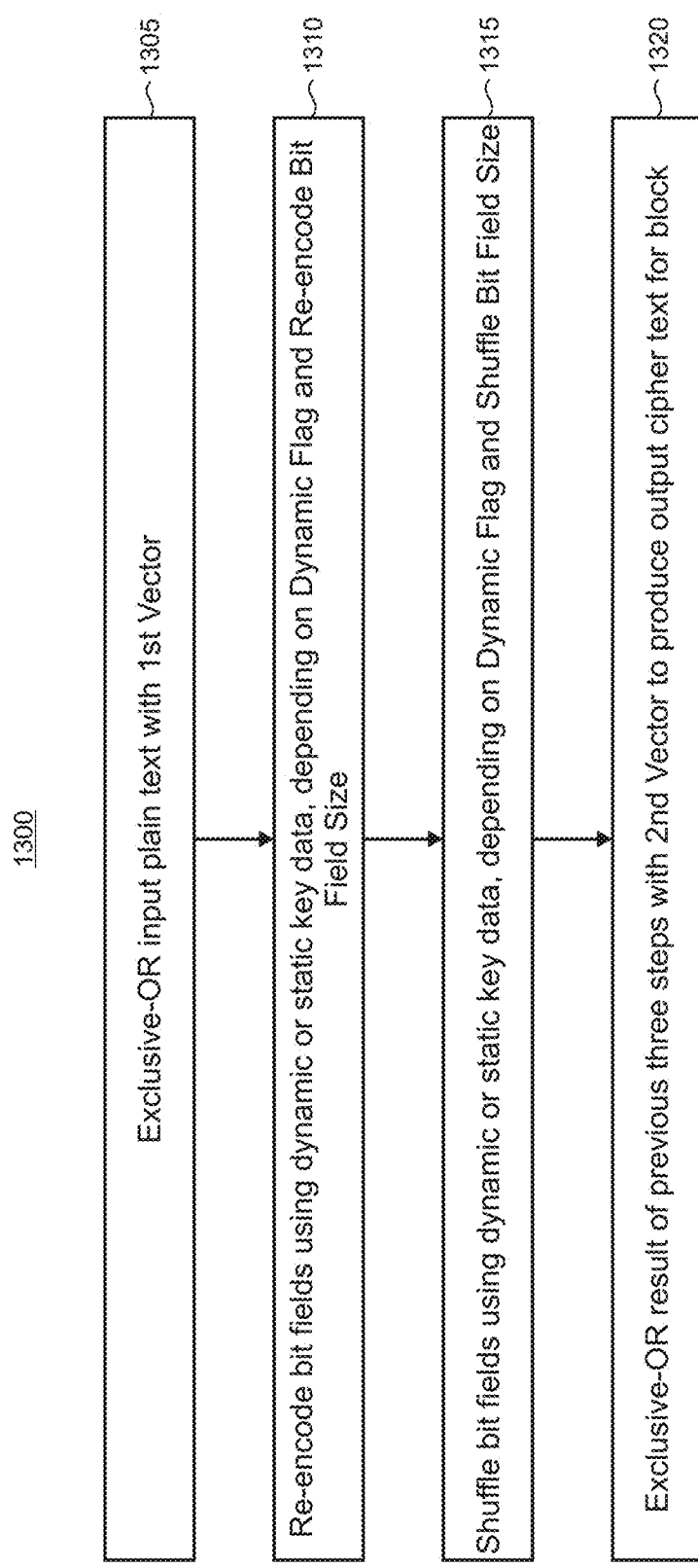
FIG. 13 is an illustrative encryption "sandwich" in which exclusive-OR operations are used before and after re-encoding and shuffling bit fields to produce an output block of cipher text.

FIG. 13 is an illustrative encryption "sandwich" process 1300 in which exclusive-OR operations are used before and after the bit field re-encoding and shuffling to produce an output block of cipher text. In step 1305, input plain text is subjected to an exclusive-OR operation with the first vector of pseudo-random number data discussed above. In step 1310, bit fields in the block are re-encoded using dynamic or static keys, depending on dynamic flag and re-encode bit field size values as included in the configuration data. The only non-optional part of the "encryption sandwich" in typical implementations is a single exclusive OR operation with a vector of pseudo-random numbers. Combined with techniques such as varying block size, spinning and random number insertion, this can produce very strong encryption for which it is extremely difficult to obtain data regarding the state of the pseudo-random number generator even when the attacker can inject known plain text. Using the second vector and and/or one or more secondary encryption techniques inside the "sandwich" increases encryption strength and further obscures the state of the pseudo-random number generator. Simplifying the "sandwich" reduces the number of operations needed to perform encryption. This can be done for implementations for which fast execution is desired. Other encryption techniques could also be used instead of, or in addition to, bit field re-encode and bit field shuffle. Using exclusive-OR with vectors of pseudo-random numbers before and possibly also after will hide the state of the secondary encryption techniques.

In step 1315, bit fields in the block are shuffled using dynamic or static key data, depending on dynamic flag and shuffle bit field size values are included in the configuration data. In step 1320, an exclusive-OR operation is performed using the result of steps 1305, 1310, and 1315 with the second vector of pseudo-random number data, as discussed above, to produce output cipher text for the block.

Figure 14:
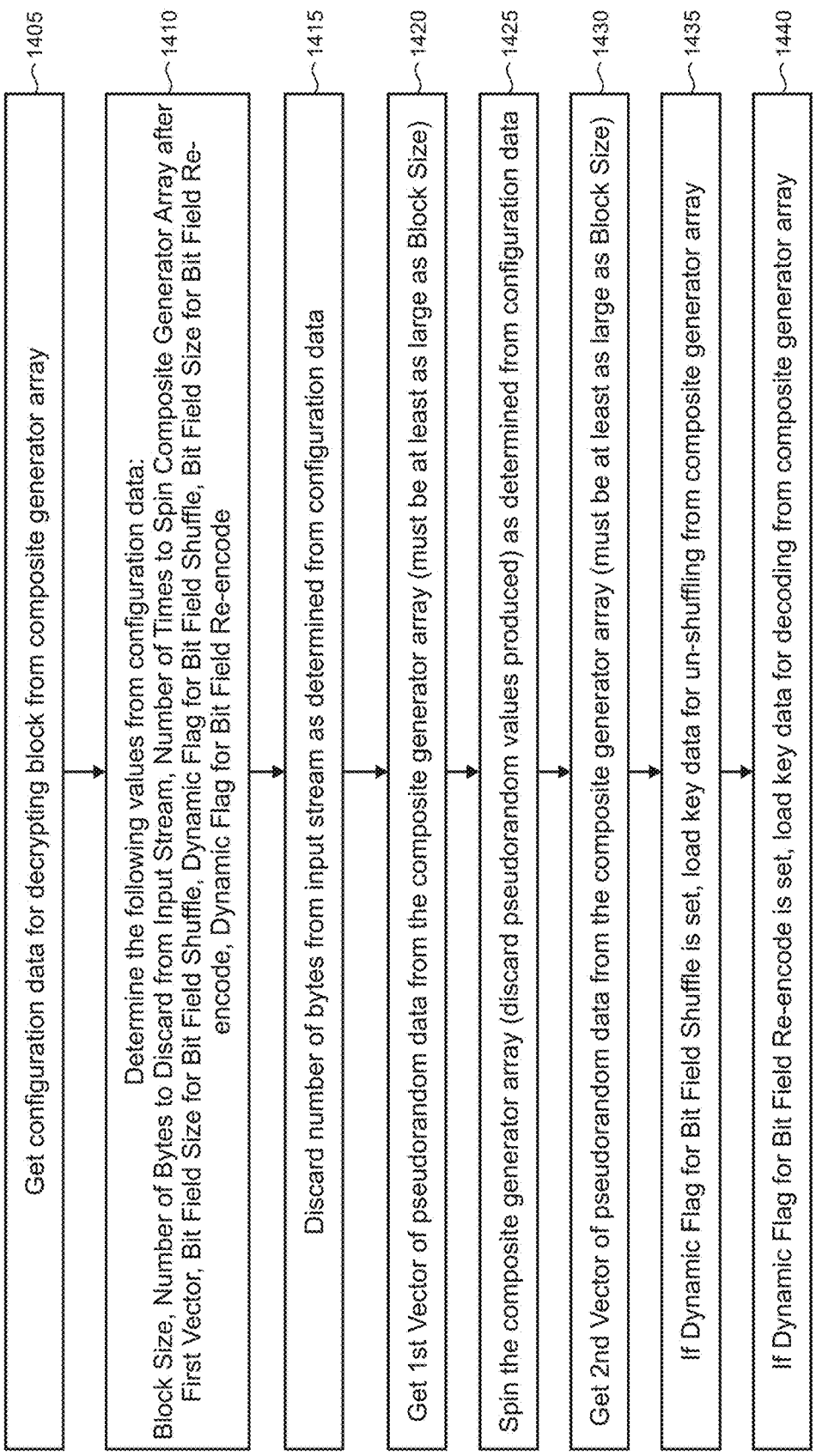
FIG. 14 is an illustrative flowchart for preparing to decrypt a block of cipher text into plain text using MetaEncrypt; the complete decryption process is FIG. 14 followed by FIG. 15.

FIG. 14 is an illustrative flowchart 1400 for preparing to decrypt a block of cipher text using MetaEncrypt. The decryption is completed in FIG. 15, producing the output plain text. If the encryption process is simplified and one or more of the steps in FIG. 12 are removed, corresponding step(s) must be removed from the decryption process in FIG. 14. In step 1405, configuration data is obtained from the composite pseudo-random number generator array 800 (FIG. 8). The following values are determined from the configuration data in step 1410: Block Size, Number of Bytes to Discard from Input Stream, Number of Times to Spin Composite Generator Array after First Vector, Bit Field Size for Bit Field Shuffle, Dynamic Flag for Bit Field Shuffle, Bit Field Size for Bit Field Re-encode, Dynamic Flag for Bit Field Re-encode.

In step 1415, a number of bytes is discarded from the input stream as determined from the configuration data to remove the random values inserted by the encryption process in FIG. 12 step 1215. In step 1420, a first vector of pseudo-random number data is obtained from the composite pseudo-random number generator array 800 (FIG. 8). The first vector must typically be at least as large as the block size of plain text that is being encrypted. In step 1425, the composite pseudo-random number generator array is subjected to spinning as determined from configuration data, where the pseudo-random values that are produced are discarded. In step 1430, a second vector of pseudo-random number data is obtained from the composite pseudo-random number generator array. The second vector must typically be at least as large as the block size of plain text that is being encrypted.

In step 1435, If a dynamic flag for a bit field shuffle operation is set, then key data is loaded for un-shuffling from the composite pseudo-random number generator array 800. In step 1440, if a dynamic flag for bit field re-encode is set, then key data is loaded for decoding from the composite pseudo-random number generator array 800.

Figure 15:
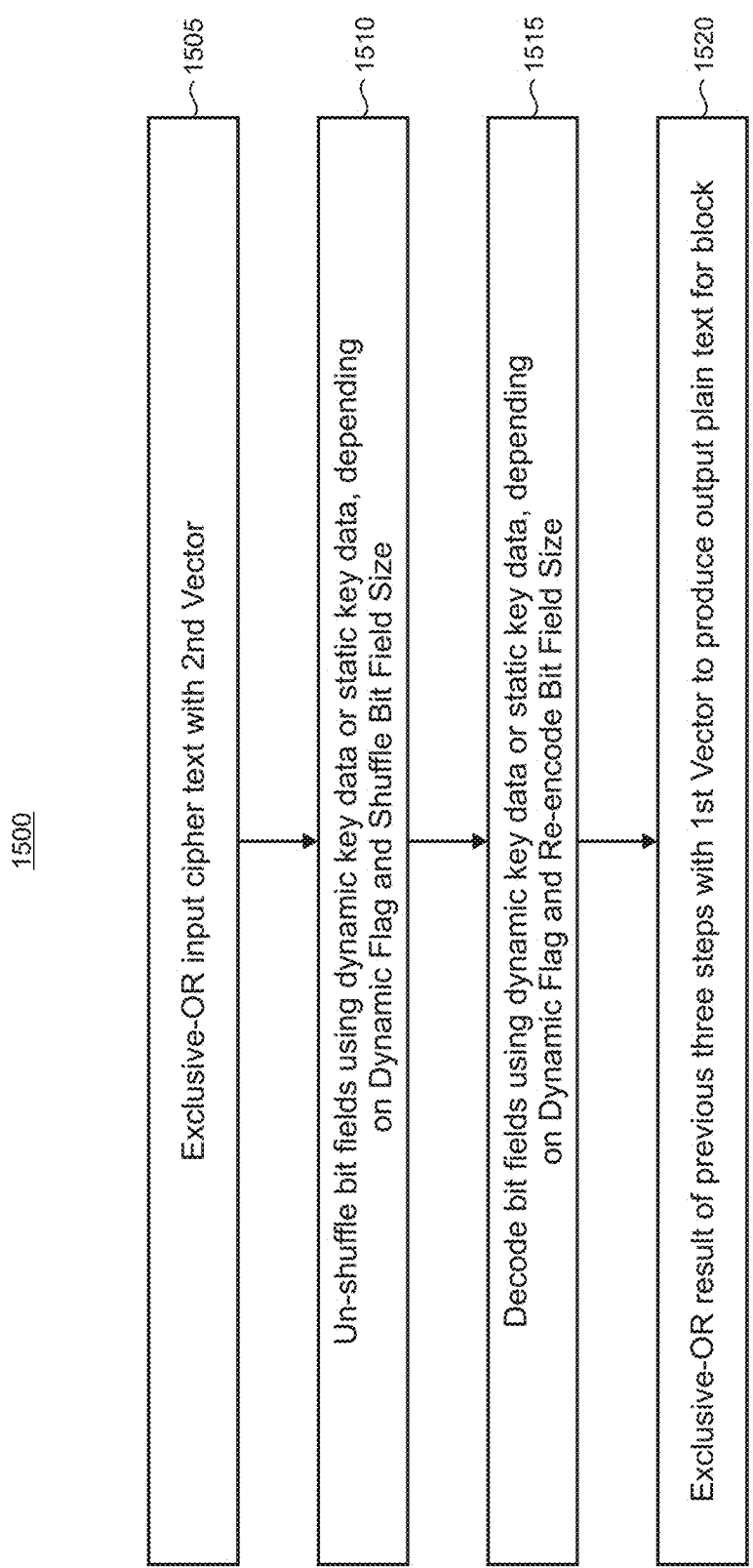
FIG. 15 is an illustrative decryption "sandwich" in which exclusive-OR operations are used before and after decoding and un-shuffling bit fields to produce an output block of plain text.

FIG. 15 is an illustrative decryption "sandwich" process 1500 in which exclusive-OR operations are used before and after decoding and un-shuffling bit fields to produce an output block of plain text. In step 1505, input cipher text is subjected to an exclusive-OR operation with the second vector of pseudo-random number data discussed above. In step 1510, bit fields in the block are un-shuffled using dynamic or static keys, depending on dynamic flag and shuffle bit field size values as included in the configuration data. This operation reverses the encryption process performed in FIG. 13 and must have elements corresponding to those used in the encryption process, executed in reverse order. Simplifying the "sandwich" reduces the number of operations needed to perform decryption for implementations for which fast execution is essential.

In step 1515, bit fields in the block are decoded using dynamic or static key data, depending on dynamic flag and re-encode bit field size values are included in the configuration data. In step 1520, an exclusive-OR operation is performed using the result of steps 1505, 1510, and 1515 with the first vector of pseudo-random number data, as discussed above, to produce output cipher text for the block.

Figure 16:
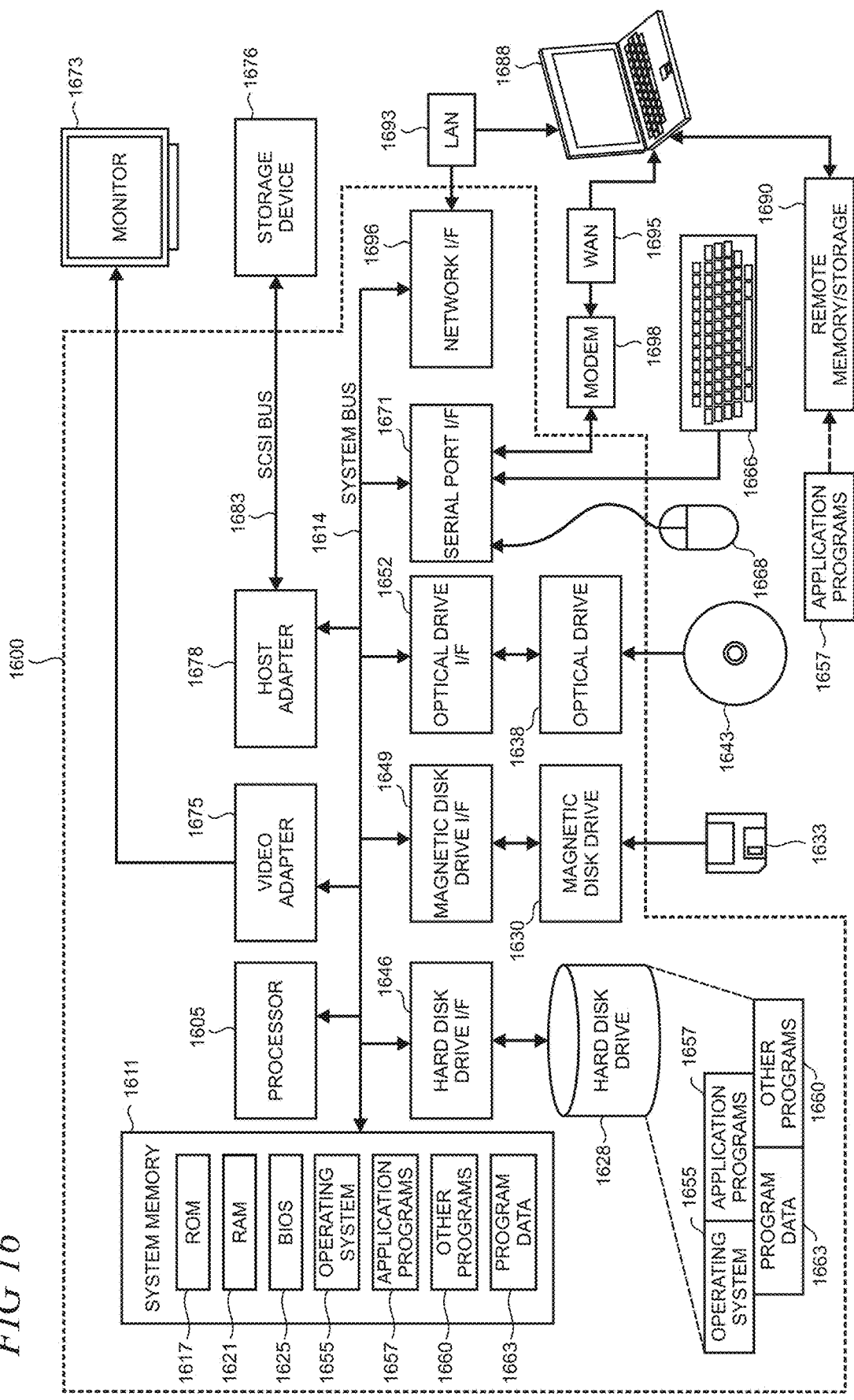
FIG. 16 shows a block diagram of illustrative computing device such as a personal computer (PC).

FIG. 16 is a simplified block diagram of an illustrative computer system 1600 such as a PC, client machine, or server with which the present invention may be implemented. Computer system 1600 includes a processor 1605, a system memory 1611, and a system bus 1614 that couples various system components including the system memory 1611 to the processor 1605. The system bus 1614 may be any of several types of bus structures including a memory bus or memory controller, a peripheral bus, or a local bus using any of a variety of bus architectures. The system memory 1611 includes read only memory (ROM) 1617 and random access memory (RAM) 1621. A basic input/output system (BIOS) 1625, containing the basic routines that help to transfer information between elements within the computer system 1600, such as during startup, is stored in ROM 1617. The computer system 1600 may further include a hard disk drive 1628 for reading from and writing to an internally disposed hard disk (not shown), a magnetic disk drive 1630 for reading from or writing to a removable magnetic disk 1633 (e.g., a floppy disk), and an optical disk drive 1638 for reading from or writing to a removable optical disk 1643 such as a CD (compact disc), DVD (digital versatile disc), or other optical media. The hard disk drive 1628, magnetic disk drive 1630, and optical disk drive 1638 are connected to the system bus 1614 by a hard disk drive interface 1646, a magnetic disk drive interface 1649, and an optical drive interface 1652, respectively. The drives and their associated computer-readable storage media provide non-volatile storage of computer-readable instructions, data structures, program modules, and other data for the computer system 1600. Although this illustrative example includes a hard disk, a removable magnetic disk 1633, and a removable optical disk 1643, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present invention. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 1633, optical disk 1643, ROM 1617, or RAM 1621, including an operating system 1655, one or more application programs 1657, other program modules 1660, and program data 1663. A user may enter commands and information into the computer system 1600 through input devices such as a keyboard 1666 and pointing device 1668 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1605 through a serial port interface 1671 that is coupled to the system bus 1614, but may be connected by other interfaces, such as a parallel port, game port, or universal serial bus (USB). A monitor 1673 or other type of display device is also connected to the system bus 1614 via an interface, such as a video adapter 1675. In addition to the monitor 1673, personal computers typically include other peripheral output devices (not shown), such as speakers and printers. The illustrative example shown in FIG. 16 also includes a host adapter 1678, a Small Computer System Interface (SCSI) bus 1683, and an external storage device 1676 connected to the SCSI bus 1683.

The computer system 1600 is operable in a networked environment using logical connections to one or more remote computers, such as a remote computer 1688. The remote computer 1688 may be selected as another personal computer, a server, a router, a network PC, a peer device, or other common network node, and typically includes many or all of the elements described above relative to the computer system 1600, although only a single representative remote memory/storage device 1690 is shown in FIG. 16. The logical connections depicted in FIG. 16 include a local area network (LAN) 1693 and a wide area network (WAN) 1695. Such networking environments are often deployed, for example, in offices, enterprise-wide computer networks, intranets, and the Internet.

When used in a LAN networking environment, the computer system 1600 is connected to the local area network 1693 through a network interface or adapter 1696. When used in a WAN networking environment, the computer system 1600 typically includes a broadband modem 1698, network gateway, or other means for establishing communications over the wide area network 1695, such as the Internet. The broadband modem 1698, which may be internal or external, is connected to the system bus 1614 via a serial port interface 1671. In a networked environment, program modules related to the computer system 1600, or portions thereof, may be stored in the remote memory storage device 1690. It is noted that the network connections shown in FIG. 16 are illustrative and other means of establishing a communications link between the computers may be used depending on the specific requirements of an application of the present invention.

The subject matter described above is provided by way of illustration only and is not be construed as limiting. Various modifications and changes may be made to the subject matter described herein without following the example embodiments and applications illustrated and described, and without departing from the true spirit and scope of the present invention, which is set forth in the following claims. Although the invention has been described with reference to a particular embodiment, this description is not meant to be construed in a limiting sense. Various modifications of the disclosed embodiments as well as alternative embodiments of the invention will become apparent to persons skilled in the art. It is therefore contemplated that the appended claims will cover any such modifications or embodiments that fall within the scope of the invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

The invention claimed is:

1. A method implemented on a computing device for decrypting a computer-readable cipher file, comprising:
   providing a decryption engine with a variably sized operating state, wherein the decryption engine includes static data handling components and extended data handling components comprising respective pseudo-random number generators configured in a variably sized array;
   utilizing data associated with a key in the decryption engine, wherein the key data is variably sized;
   configuring the decryption engine state to be sized to be at least as large as the utilized key data;
   allocating an amount of the key data for handling by the static data handling components;
   allocating at least a portion of a remaining amount of the key data for handling among the extended data handling components;
   utilizing the extended data handling components for primary decryption of the computer-readable cipher file; and utilizing the static data handling components for secondary decryption of the computer-readable cipher file.

2. The method of claim 1 in which one or more of the pseudo-random number generators comprise a composite pseudo-random number generator including a linear congruential pseudo-random number generator and an additive lagged Fibonacci pseudo-random number generator.

3. The method of claim 2 in which one or more of the pseudo-random number generators include a selector configured to select either the linear congruential pseudo-random number generator or the additive lagged Fibonacci pseudo-random number generator to produce an output.

4. The method of claim 2 in which one or more of the pseudo-random number generators include a shuffle buffer configured to perform a modulus computation of an input value with a size of the shuffle buffer to thereby obscure calculation of the input value, the input value being derived from the key data.

5. The method of claim 1 in which the static data handling components comprise a bit-field shuffle table.

6. The method of claim 1 in which the static data handling components comprise a bit-field re-encode table.

7. One or more computer-readable storage media storing computer-executable instructions for decrypting a computer-readable cipher file which, when executed by one or more processors disposed in a computing device, cause the computing device to:
provide a decryption engine with a variably sized operating state, wherein the decryption engine includes static data handling components and extended data handling components comprising respective pseudo-random number generators configured in a variably sized array;
utilize data associated with a key in the decryption engine, wherein the key data is variably sized;
configure the decryption engine state to be sized to be at least as large as the utilized key data;
allocate an amount of the key data for handling by the static data handling components;
allocate at least a portion of a remaining amount of the key data for handling among the extended data handling components;
utilize the extended data handling components for primary decryption of the computer-readable cipher file; and
utilize the static data handling components for secondary decryption of the computer-readable cipher file.

8. The one or more computer-readable storage media of claim 7 in which one or more of the pseudo-random number generators comprise a composite pseudo-random number generator including a linear congruential pseudo-random number generator and an additive lagged Fibonacci pseudo-random number generator.

9. The one or more computer-readable storage media of claim 8 in which one or more of the pseudo-random number generators include a selector configured to select either the linear congruential pseudo-random number generator or the additive lagged Fibonacci pseudo-random number generator to produce an output.

10. The one or more computer-readable storage media of claim 8 in which one or more of the pseudo-random number generators include a shuffle buffer configured to perform a modulus computation of an input value with a size of the shuffle buffer to thereby obscure calculation of the input value, the input value being derived from the key data.

11. The one or more computer-readable storage media of claim 7 in which the static data handling components comprise a bit-field shuffle table.

12. The one or more computer-readable storage media of claim 7 in which the static data handling components comprise a bit-field re-encode table.

13. A computing device configured for decrypting a computer-readable cipher file, comprising:
one or more processors; and
one or more computer-readable memory devices storing instructions which, when executed by the one or more processors, cause the computing device to:
provide a decryption engine with a variably sized operating state, wherein the decryption engine includes static data handling components and extended data handling components comprising respective pseudo-random number generators configured in a variably sized array;
utilize data associated with a key in the decryption engine, wherein the key data is variably sized;
configure the decryption engine state to be sized to be at least as large as the utilized key data;
allocate an amount of the key data for handling by the static data handling components;
allocate at least a portion of a remaining amount of the key data for handling among the extended data handling components;
utilize the extended data handling components for primary decryption of the computer-readable cipher file; and
utilize the static data handling components for secondary decryption of the computer-readable cipher file.

14. The computing device of claim 13 in which one or more of the pseudo-random number generators comprise a composite pseudo-random number generator including a linear congruential pseudo-random number generator and an additive lagged Fibonacci pseudo-random number generator.

15. The computing device of claim 14 in which one or more of the pseudo-random number generators include a selector configured to select either the linear congruential pseudo-random number generator or the additive lagged Fibonacci pseudo-random number generator to produce an output.

16. The computing device of claim 14 in which one or more of the pseudo-random number generators include a shuffle buffer configured to perform a modulus computation of an input value with a size of the shuffle buffer to thereby obscure calculation of the input value, the input value being derived from the key data.

17. The computing device of claim 13 in which the static data handling components comprise a bit-field shuffle table.

18. The computing device of claim 13 in which the static data handling components comprise a bit-field re-encode table.

* * * * *